(12) United States Patent
Berg

(10) Patent No.: US 7,097,564 B2
(45) Date of Patent: Aug. 29, 2006

(54) FLEXIBLE COUPLING WITH RADIALLY OFFSET BEAMS FORMED BY ASYMMETRIC SLOT PAIRS

(75) Inventor: Dennis G. Berg, East Rockaway, NY (US)

(73) Assignee: Rino Mechanical Components, Inc., Freeport, NY (US)

( * ) Notice: Subject to any disclaimer, the term of this patent is extended or adjusted under 35 U.S.C. 154(b) by 16 days.

(21) Appl. No.: 10/491,024

(22) PCT Filed: Sep. 25, 2002

(86) PCT No.: PCT/US02/30668

§ 371 (c)(1),
(2), (4) Date: Mar. 25, 2004

(87) PCT Pub. No.: WO03/027524

PCT Pub. Date: Apr. 3, 2003

(65) Prior Publication Data

US 2004/0176172 A1    Sep. 9, 2004

Related U.S. Application Data

(60) Provisional application No. 60/325,429, filed on Sep. 27, 2001.

(51) Int. Cl.
*F16D 3/78* (2006.01)

(52) U.S. Cl. .................... 464/78; 29/896.9; 267/181

(58) Field of Classification Search ............ 464/52, 464/78–50, 99; 74/502.5; 403/220; 267/181; 29/896.9
See application file for complete search history.

(56) References Cited

U.S. PATENT DOCUMENTS

| | | | | |
|---|---|---|---|---|
| 1,987,316 A | * | 1/1935 | Zimmer | 464/78 |
| 3,844,137 A | * | 10/1974 | Zugel | 464/78 |
| 4,203,305 A | | 5/1980 | Williams | |
| 4,690,661 A | * | 9/1987 | Fredericks et al. | 464/78 |
| 5,299,980 A | * | 4/1994 | Agius | 464/78 |
| 5,741,429 A | * | 4/1998 | Donadio et al. | |
| 6,203,437 B1 | * | 3/2001 | Durie et al. | 464/78 |

OTHER PUBLICATIONS

Ricker, John B., Radial-Beam Couplings: A Cut Above the Rest, Machine Design, Jul. 6, 2000, pp. 84-86, Penton Media, Inc., Cleveland, Ohio. 3 pages.
"Hunt Power Drives" catalogue sheet, Helical Products Company, Inc., Santa Maria, California, date prior to Mar. 17, 2000, 2 pages.
"Power Transmission Flexible Couplings" catalogue sheet, Nordex, Inc., Danbury, Connecticut, date prior to Mar. 17, 2000, 2 pages.
"Flexible Couplings for Motion Control" catalogue sheet, Renbrandt, Inc., Boston, Massachusetts, date prior to Mar. 17, 2000, 3 pages.

* cited by examiner

Primary Examiner—Greg Binda
(74) Attorney, Agent, or Firm—Robert S. Stoll

(57) ABSTRACT

A flexible coupling for flexibly joining two shafts includes a unitary solid cylindrical body having a first end, a second end, and therebetween having one or more longitudinally spaced circular disks spaced by asymmetric slot pairs; a radially offset beam formed between a first slot and a second slot of each asymmetric slot pair, such that the radially offset beam is parallel to a diameter of the cylindrical body and is offset from the parallel diameter by a radial beam offset distance R1; each beam being rotationally offset from longitudinally adjacent beams; and hub means at the first end for coaxially connecting the first end to a first one of the two shafts, and hub means at the second end for coaxially connecting the second end to a second one of the two shafts.

19 Claims, 3 Drawing Sheets

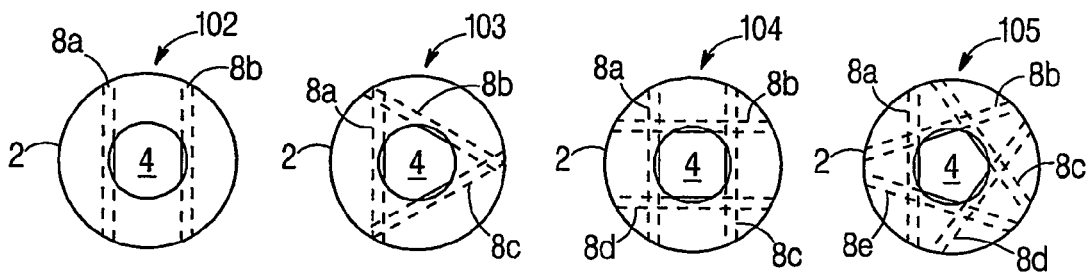
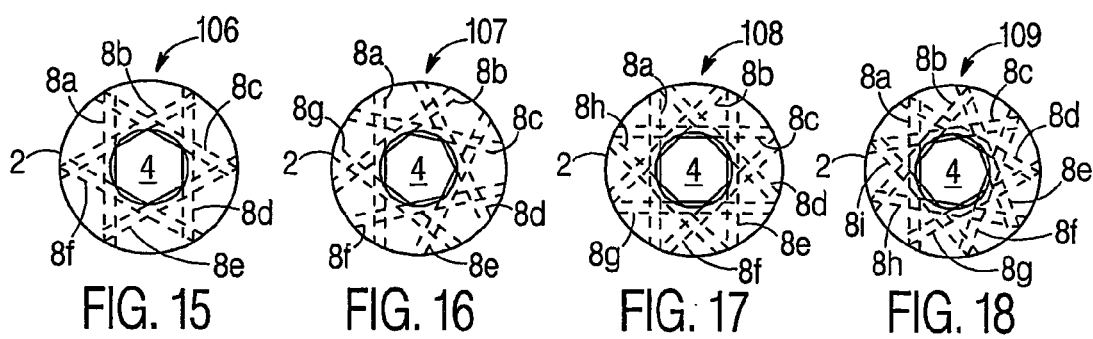
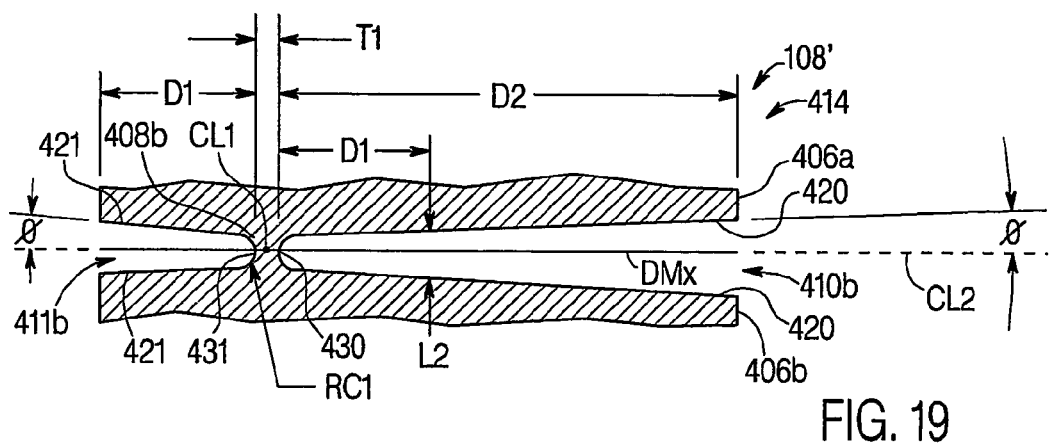
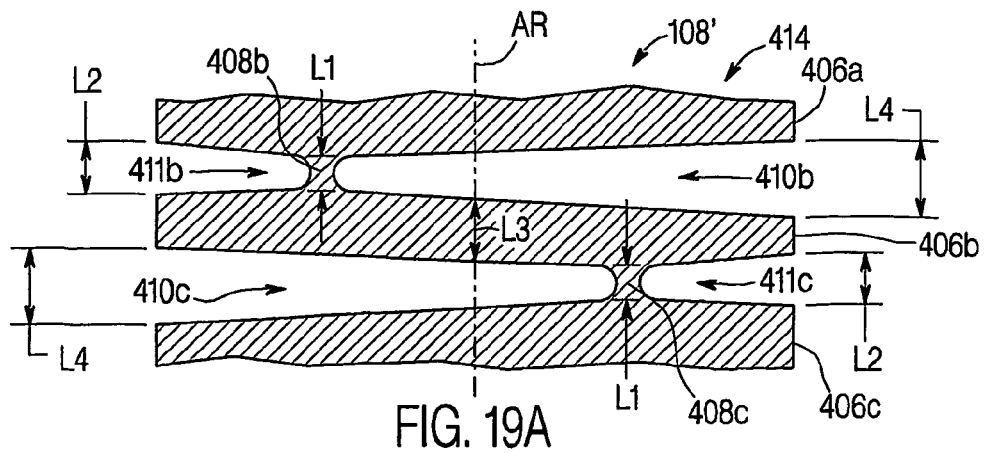

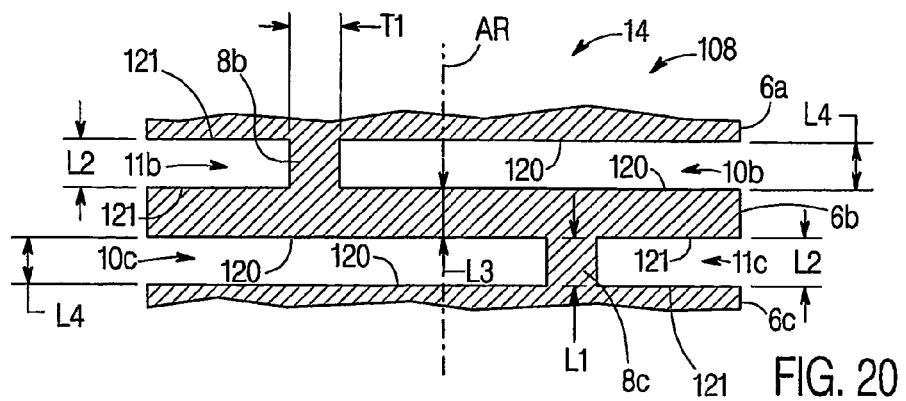
FIG. 20
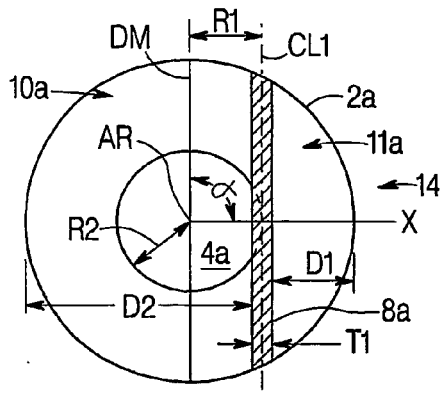
FIG. 21
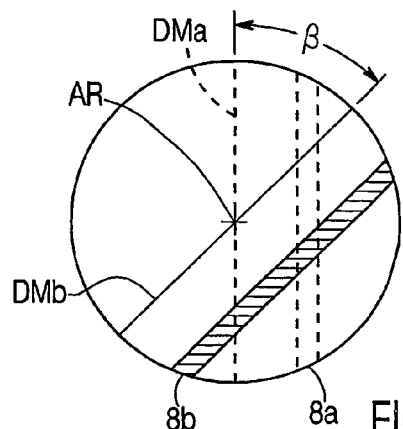
FIG. 21A
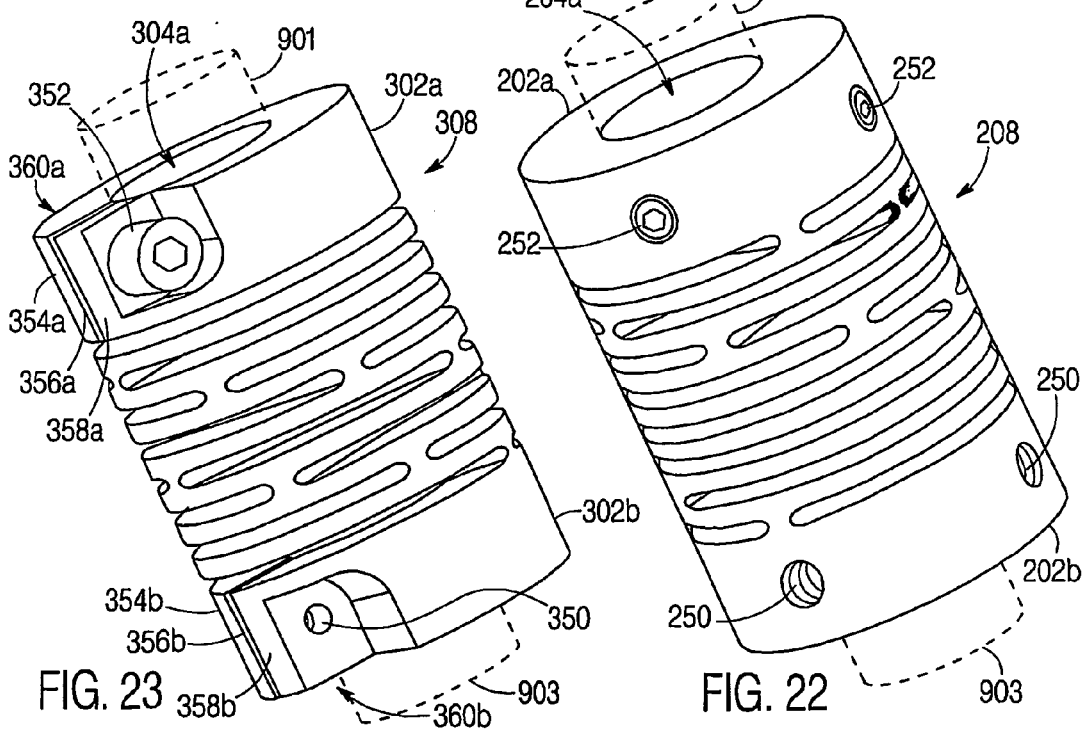
FIG. 23
FIG. 22

FLEXIBLE COUPLING WITH RADIALLY OFFSET BEAMS FORMED BY ASYMMETRIC SLOT PAIRS

CROSS-REFERENCE TO RELATED APPLICATIONS

This application claims the benefit of U.S. Provisional Patent Application No. 60/325,429, filed Sep. 27, 2001 by Dennis G. Berg.

TECHNICAL FIELD OF THE INVENTION

The present invention relates to a flexible coupling for coupling two shafts, and more particularly to a flexible coupling with a slot-formed beam construction.

BACKGROUND OF THE INVENTION

The use of flexible couplings for interconnecting driving and driven shafts of precision instruments wherein the coupling is capable of accommodating shaft misalignments and axial shaft movements and permits limited torsional or radial deflection thereof is well known. In selected portions of an article entitled "Radial-Beam Couplings: A Cut Above the Rest" (*Machine Design*; Jul. 6, 2000) John B. Ricker states: "Of the many types available, single piece flexible couplings are the least expensive, and common geometries include radial slotted beam, helical or spiral, and bellows. The most critical factors to consider when choosing flexible couplings include torque capacity, torsional stiffness, bearing loads, transmission errors, shaft misalignment, and service life. Torque capacity is a measure of the coupler's amount of angular or parallel offset allowed from motor to load, and the life expectancy of the coupling. That is, stiff couplings operating under relatively high stress from large offsets can't survive millions of operating cycles. Transmission errors manifest themselves as small variations in velocity and position between motor and load. The variations are due primarily to coupling geometry and relative size. Bellows couplings usually provide the lowest transmission errors and radial bearing loads, good lateral flexibility, and the highest torsional stiffness. However, they have lower peak and running torque for equivalent sizes and are the most expensive. Bellows couplings have been traditionally used in smaller stepmotor and servomotor-driven systems. By comparison, helical or spiral couplings have sufficient lateral flexibility to handle large shaft offsets. But they also have only moderate torsional stiffness and the largest transmission errors. Helical couplings are generally categorized by the number of starting slots. For example, a single-beam helical coupling has one continuous cut throughout its entire one-piece flexing or working length. By contrast, a six-beam coupling has two sets of three helical cuts 120° apart separated by a center piece. A hub at each end of the coupling connects the motor drive shaft to the load, or feedback devices such as resolvers and encoders to lead screws and power transmission components. Ordinary radial beam slotted-type couplings fall between the above two types for cost, torsional stiffness, and transmission errors (driving an encoder), but produce the highest radial bearing load."

An example of a helical flexible coupling is shown by U.S. Pat. No. 4,203,305 (Williams; 1980) which discloses a flexible coupling for torque transmission having a plurality of helical beams extending between the coupling ends.

An example of a radial beam slotted-type coupling is shown by U.S. Pat. No. 5,299,980 (Agius; 1994) which discloses a constant velocity flexible coupling for coupling two shafts that has a solid unitary body (22) with a plurality of complimentary pairs of slots (e.g., 34 paired with 36) positioned between a first and second end (hubs 24, 26). The plurality of complimentary pairs of slots extend inwardly from the circumference of the (cylindrical) body to a predetermined depth so as to form a plurality of beams (e.g., 46) between the complimentary pairs of slots. A plurality of disks (e.g., 111, 112) are formed in the body by the plurality of complementary pairs of slots, and the plurality of beams join and bridge the space between adjacent disks. Adjacent beams (e.g., 46, 64 or 78, 84) are angularly offset by a number of degrees (e.g., 90 degrees or e.g., 30 degrees). The illustrations (FIGS. 1–16) show that the "complimentary pairs of slots extending inwardly from the circumference of the body to a predetermined depth" form radial beams that are centered on diameters of the cylindrical beam, i.e., the "predetermined depth" is the same for each of the slots in a "complimentary pair of slots".

As stated in the Ricker article hereinabove, radial beam slotted-type couplings fall between the bellows and helical types of flexible couplings in terms of cost, torsional stiffness, radial bearing load, and transmission errors. It is an object of the present invention to provide a novel flexible coupling that achieves performance advantages of both the bellows type and the slotted radial beam type while maintaining the low cost advantage of slot and beam types of flexible couplings.

BRIEF SUMMARY OF THE INVENTION

According to the invention, a flexible coupling for flexibly joining two shafts comprises a unitary solid cylindrical body having a first end, a second end, and therebetween having one or more longitudinally spaced circular disks spaced by asymmetric slot pairs; a radially offset beam, having a minimum beam thickness T1 and a longitudinal beam length L1, formed between a first slot and a second slot of each asymmetric slot pair, such that the radially offset beam is parallel to a diameter of the cylindrical body and is offset from the parallel diameter by a radial beam offset distance R1; each beam being rotationally offset from longitudinally adjacent beams; and hub means at the first end for coaxially connecting the first end to a first one of the two shafts, and hub means at the second end for coaxially connecting the second end to a second one of the two shafts.

According to the invention, the radial beam offset distance R1 is at least equal to or greater than a radius R2 of a coaxial shaft hole of the hub means at the first end or at the second end.

According to the invention, a rotational offset angle between longitudinally adjacent beams has the same magnitude for all pairs of longitudinally adjacent beams; and the rotational offset angle has a magnitude that divides into 360 degrees an integer number N times. Preferably the quantity of beams is an integer multiple of the number N. Also preferably the rotational offset angle increments in the same rotational direction from each beam to each beam's next longitudinally adjacent beam progressing from a first beam at the first end to a last beam at the second end. However, the rotational increment may vary and is not required to be the same.

According to the invention, all of the disks have a same nominal disk length (thickness) L3; and all of the first slots and all of the second slots have a same nominal slot length L2. Preferably the nominal disk length L3 is at least equal to, and may be greater than, a minimum value of the beam length L1.

According to the invention, the beam length L1 has a constant value for the entire beam.

According to the invention, the sides of the first slots and the sides of the second slots all have a single valued slot slope angle with respect to the plane of a radial slot centerline, wherein the slot slope angle has a value of up to 5 degrees. Preferably the slot slope angle has a value of up to 2 degrees.

According to the invention, each beam has a beam thickness that is uniformly equal to the minimum beam thickness T1 throughout a longitudinal length between adjacent disks.

According to the invention, each beam has a beam thickness that varies along a longitudinal length between adjacent disks, such that the minimum beam thickness T1 occurs in the approximate center of the longitudinal length, and the beam thickness increases from the minimum thickness T1 to a maximum where the beam joins a disk, with the increase being determined by rounded bottoms on the first slot and on the second slot of the asymmetric slot pair that formed the beam.

According to the invention, the hub means for coaxially connecting each of the first and second ends to one of the two shafts comprises a shaft hole with set screws, clamps or other means.

According to the invention, the two shafts are rotating members having potentially different axes of rotation. Alternatively, the two shafts are structural members that require flexible joining.

According to the invention, a method of flexibly joining two shafts with a flexible coupling, comprises the steps of: making the flexible coupling out of a unitary solid cylindrical body having a first end and a second end; forming a plurality of radially oriented asymmetric slot pairs longitudinally spaced from the first end to the second end; forming one or more circular disks longitudinally between asymmetric slot pairs; forming a radially offset beam between a first slot and a second slot of each asymmetric slot pair, such that the radially offset beam is parallel to a diameter of the cylindrical body and is offset from the parallel diameter by a radial beam offset distance R1; rotationally offsetting each beam from longitudinally adjacent beams; and providing hub means at the first end for coaxially connecting the first end to a first one of the two shafts, and hub means at the second end for coaxially connecting the second end to a second one of the two shafts. The term "unitary" may include inserts affixed to or molded in the body.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. By way of example not related to the present description, each of a plurality of elements collectively referred to as 199 may be referred to individually as 199*a*, 199*b*, 199*c*, etc. Or, related but modified elements may have the same number but are distinguished by primes. By way of example not related to the present description, 199, 199', and 199" may be three different elements which are similar or related in some way, but have significant modifications, e.g., a member 199 having a static imbalance versus a similar but different member 199' of the same design, but having a couple imbalance. Such relationships, if any, between similar elements in the same or different figures will become apparent throughout the specification, including, if applicable, in the claims and abstract.

Figure 1:
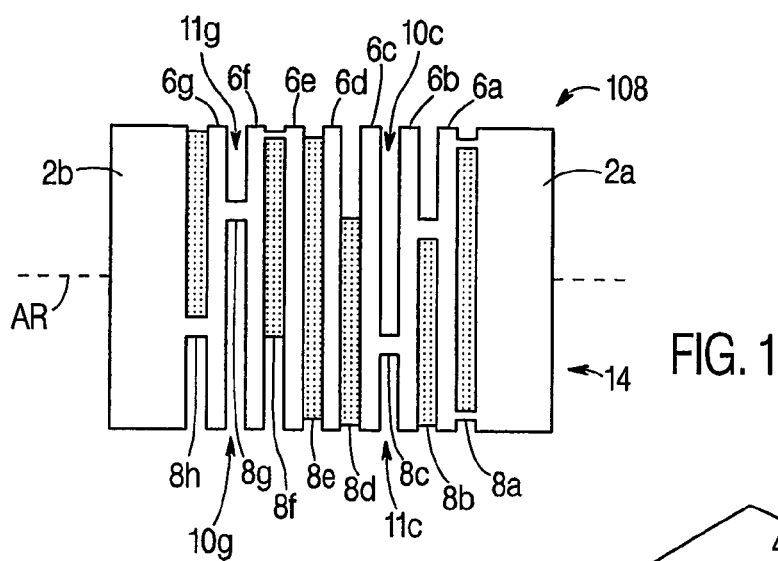
Figure 2:
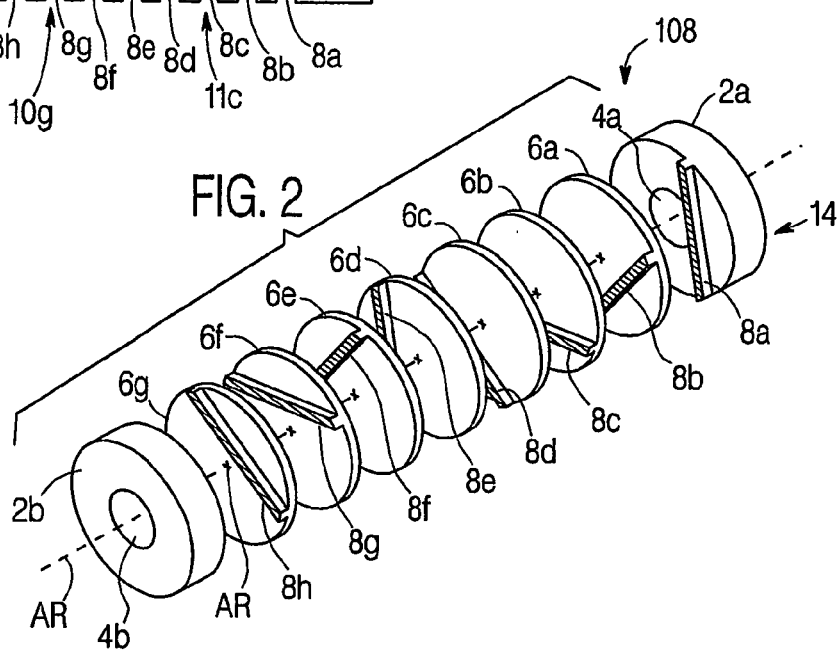
Figures 3, 4, 5, 6:
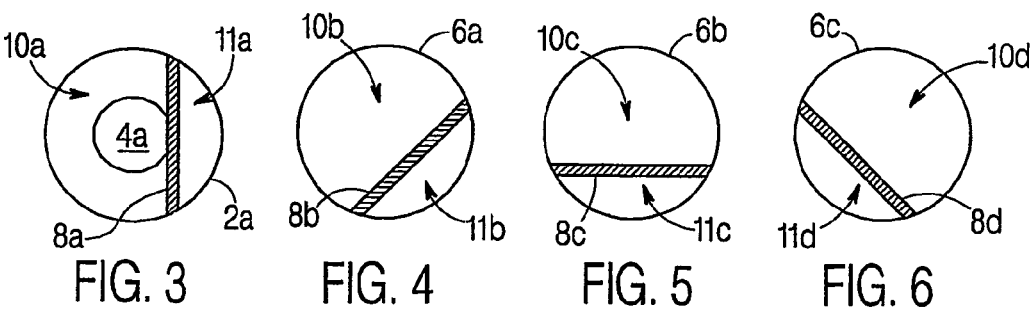
Figures 7, 8, 9, 10:
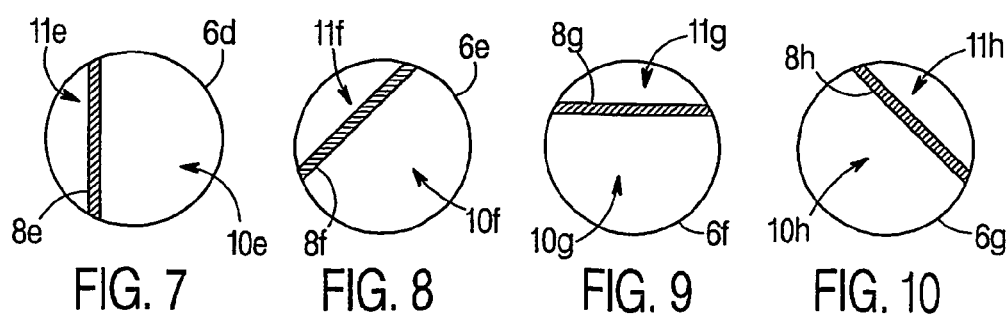

The structure, operation, and advantages of the present preferred embodiment of the invention will become further apparent upon consideration of the following description taken in conjunction with the accompanying drawings, wherein:

FIG. 1 is a side view of a flexible coupling according to the invention, wherein the visible sides of radially offset beams are speckled for emphasis;

FIG. 2 is an exploded perspective view of the flexible coupling of FIG. 1 showing cross-sections of the beams between successive disks, according to the invention;

FIG. 3 is an end view of a cross-section through the first (right-hand) beam of FIGS. 1 and 2 showing radial offset and rotational angular positioning of the beam, according to the invention;

FIG. 4 is an end view of a cross-section through the second beam from the right of FIGS. 1 and 2, showing radial offset and rotational angular positioning of the beam, according to the invention;

FIG. 5 is an end view of a cross-section through the third beam from the right of FIGS. 1 and 2, showing radial offset and rotational angular positioning of the beam, according to the invention;

FIG. 6 is an end view of a cross-section through the fourth beam from the right of FIGS. 1 and 2, showing radial offset and rotational angular positioning of the beam, according to the invention;

FIG. 7 is an end view of a cross-section through the fifth beam from the right of FIGS. 1 and 2, showing radial offset and rotational angular positioning of the beam, according to the invention;

FIG. 8 is an end view of a cross-section through the sixth beam from the right of FIGS. 1 and 2, showing radial offset and rotational angular positioning of the beam, according to the invention;

FIG. 9 is an end view of a cross-section through the seventh beam from the right of FIGS. 1 and 2, showing radial offset and rotational angular positioning of the beam, according to the invention;

FIG. 10 is an end view of a cross-section through the eighth beam from the right of FIGS. 1 and 2, showing radial offset and rotational angular positioning of the beam, according to the invention;

FIG. 11 is an end view of a flexible coupling with two beams hidden below an end hub, the beams indicated by dashed lines, showing radial offset and rotational angular positioning of the beams, according to the invention;

FIG. 12 is an end view of a flexible coupling with three beams hidden below an end hub, the beams indicated by dashed lines, showing radial offset and rotational angular positioning of the beams, according to the invention;

FIG. 13 is an end view of a flexible coupling with four beams hidden below an end hub, the beams indicated by dashed lines, showing radial offset and rotational angular positioning of the beams, according to the invention;

FIG. 14 is an end view of a flexible coupling with five beams hidden below an end hub, the beams indicated by dashed lines, showing radial offset and rotational angular positioning of the beams, according to the invention;

FIG. 15 is an end view of a flexible coupling with six beams hidden below an end hub, the beams indicated by dashed lines, showing radial offset and rotational angular positioning of the beams, according to the invention;

FIG. 16 is an end view of a flexible coupling with seven beams hidden below an end hub, the beams indicated by dashed lines, showing radial offset and rotational angular positioning of the beams, according to the invention;

FIG. 17 is an end view of a flexible coupling with eight beams hidden below an end hub, the beams indicated by dashed lines, showing radial offset and rotational angular positioning of the beams, according to the invention;

FIG. 18 is an end view of a flexible coupling with nine beams hidden below an end hub, the beams indicated by dashed lines, showing radial offset and rotational angular positioning of the beams, according to the invention;

FIG. 19 is a side cross-sectional view of a beam between portions of two adjacent disks, showing an embodiment of the flexible coupling having sloped sides and rounded ends for the slots paired around the beam, according to the invention;

FIG. 19A is a side cross-sectional view of two adjacent beams between portions of three adjacent disks, showing an embodiment of the flexible coupling having sloped sides and rounded ends for the slots paired around each beam, according to the invention;

FIG. 20 is a side cross-sectional view of two adjacent beams between portions of three adjacent disks, showing an embodiment of the flexible coupling having non-sloped sides and square ends for the slots paired around each beam, according to the invention;

FIG. 21 is the cross-sectional end view of FIG. 3, showing dimensional characteristics of the beam relative to a hub with a shaft hole, according to the invention;

FIG. 21A is the cross-sectional end view of FIG. 4 superimposed on the view of FIG. 3, showing an angular relationship between the adjacent beams of the two views, according to the invention;

FIG. 22 is a perspective view of an embodiment of the flexible coupling having shaft hole and set screw means for coaxially connecting the flexible coupling to shafts, according to the invention; and FIG. 23 is a perspective view of an embodiment of the flexible coupling having shaft hole and clamp means for coaxially connecting the flexible coupling to shafts, according to the invention.

DETAILED DESCRIPTION OF THE INVENTION

FIGS. 1 through 10 (FIGS. 1–10) show a flexible coupling 108 that is an embodiment of the present invention having eight radially offset beams. The flexible coupling 108 has a unitary solid cylindrical body 14 with first and second ends 2a, 2b that are formed as hubs having means (e.g., coaxial shaft holes 4a, 4b) for coaxially connecting each of the first and second ends 2a, 2b to one of two shafts (not part of the invention, e.g., shafts 901, 903 outlined in FIG. 22) that are to be flexibly joined by the flexible coupling 108. One or more circular disks 6a, 6b, 6c, 6d, 6e, 6f, 6g (collectively referred to as disks 6) are longitudinally spaced between the first and second ends 2a, 2b by asymmetric pairs of slots 10a/11a, 10b/11b, 10c/11c, 10d/11d, 10e/11e, 10f/11f, 10g/11g, 10h/11h (asymmetric slot pairs 10/11) forming radially offset beams 8a, 8b, 8c, 8d, 8e, 8f, 8g, 8h (collectively referred to as beams 8) therebetween. An axis of revolution AR for the cylindrical body 14 is shown extending through the length of the coupling 108. The shaft holes 4a, 4b, which are optionally of different diameters, are both coaxial to the axis of revolution AR and either shaft hole 4a, 4b optionally extends only through a corresponding end 2a, 2b, respectively, as shown, or optionally extends through at least some of the disks 6 and beams 8.

Referring to FIGS. 1, 2, and 3: longitudinally between a first end 2a and a first disk 6a, a first beam 8a is formed between a first deep slot 10a and a first shallow slot 11a (a first asymmetric slot pair 10a/11a). Referring to FIGS. 1, 2, and 4: longitudinally between the first disk 6a and a second disk 6b, a second beam 8b is formed between a second deep slot 10b and a second shallow slot 11b (a second asymmetric slot pair 10b/11b). Referring to FIGS. 1, 2, and 5: longitudinally between the second disk 6b and a third disk 6c, a third beam 8c is formed between a third deep slot 10c and a third shallow slot 11c (a third asymmetric slot pair 10c/11c). Referring to FIGS. 1, 2, and 6: longitudinally between the third disk 6c and a fourth disk 6d, a fourth beam 8d is formed between a fourth deep slot 10d and a fourth shallow slot 11d (a fourth asymmetric slot pair 10d/11d). Referring to FIGS. 1, 2, and 7: longitudinally between the fourth disk 6d and a fifth disk 6e, a fifth beam 8e is formed between a fifth deep slot 10e and a fifth shallow slot 11e (a fifth asymmetric slot pair 10e/11e). Referring to FIGS. 1, 2, and 8: longitudinally between the fifth disk 6e and a sixth disk 6f, a sixth beam 8f is formed between a sixth deep slot 10f and a sixth shallow slot 11f (a sixth asymmetric slot pair 10f/11f). Referring to FIGS. 1, 2, and 9: longitudinally between the sixth disk 6f and a seventh disk 6g, a seventh beam 8g is formed between a seventh deep slot 10g and a seventh shallow slot 11g (a seventh asymmetric slot pair 10g/11g). Referring to FIGS. 1, 2, and 10: longitudinally between the seventh disk 6g and a second end 2b, an eighth beam 8h is formed between an eighth deep slot 10h and an eighth shallow slot 11h (an eighth asymmetric slot pair 10h/11h).

An important feature of the present invention is a radial offset design for the beams 8. Referring to FIG. 21, various dimensions are shown for a view comparable to the cross-sectional views of FIGS. 3–10, but most closely representing the view of FIG. 3. The first beam 8a is formed between the first deep slot 10a and the first shallow slot 11a, such that the first beam 8a has a beam thickness T1. A beam centerline CL1 delineates the center of the beam thickness T1 along the entire length of the first beam 8a. As shown in FIG. 21 for the first beam 8a, typical of all the beams 8, the first beam 8a (i.e., the beam centerline CL1) is parallel to a diameter DM of the cylindrical body 14, a portion of which is illustrated by the first end 2a. Furthermore, the radially offset beam 8 (e.g., first beam 8a) is offset from the parallel diameter DM by a non-zero radial beam offset distance R1. Thus the asymmetric slot pair 10/11 (e.g., first asymmetric slot pair 10a/11a) comprises a first deep slot 10a with a deep slot depth D2 and a first shallow slot 11a with a shallow slot depth D1 such that the deep slot depth D2 is greater than the shallow slot depth D1, preferably significantly greater. In a preferred embodiment illustrated by FIG. 21, the radial beam offset distance R1 is equal to a shaft hole radius R2 being the radius of at least one of the shaft holes 4 (e.g., 4a). The slot depths D1 and D2 are measured from the beam 8 to an outer periphery of the body 14 along a diameter of the body 14 that is perpendicular to the beam 8 formed between the slots 11 and 10. Thus the slot depths D1 and D2 represent the greatest distance through the slots 11 and 10, respectively, measured perpendicularly from the beam 8 to the periphery of the body 14.

Compared to prior art radial beam designs, the radially offset beam design maintains excellent torsional and longitudinal stiffness, while enabling improved longitudinal bending flexibility for accommodating joined shafts that have angular and/or parallel misalignment. Each deep slot 10 is able to open wider since its paired shallow slot 11 pinches together much more due to a short pivot arm length D1. It can be seen that the radial beam design of the prior art, wherein the paired slot depths are equal and slightly less than the radius of the coupling, limits the amount of longitudinal flexing for a coupling with the same diameter as the present invention due to a relatively longer pivot arm length in any slot being pinched together.

As is readily apparent from the drawings, especially FIGS. 3–10, each beam 8 is rotationally offset from any adjacent beam. Referring to FIGS. 21 and 3, the first beam 8a is positioned at a first rotational angle α relative to an arbitrary axis labeled "x" that is orthogonal to an axis of rotation AR of the end hub 2a. The axis of rotation AR is therefore also the axis of rotation of both ends 2, of all disks 6, and of the cylindrical body 14 of the flexible coupling 108 as shown in FIGS. 1 and 2. From FIG. 4 it can be seen that the next adjacent beam, the second beam 8b, is rotated clockwise to a second rotational angle α' (not shown). Likewise, from FIG. 5 it can be seen that the next adjacent beam, the third beam 8c, is rotated clockwise to a third rotational angle α41 (not shown). The rotation of the beams 8 continues from each beam to each adjacent beam. The difference in rotational angles α between adjacent beams 8 is a rotational offset angle β. FIG. 21A illustrates an example of the rotational offset angle β shown between the first beam 8a and the adjacent second beam 8b. Since the beams 8 are radially offset, it is convenient to measure the rotational offset angle β between diameters DMa and DMb that are parallel to the beams 8a and 8b, respectively. For the sake of uniformity in flexing as the coupling 108 is rotated, preferably the rotational offset angle β has the same magnitude for all of the adjacent beams 8 such that the rotational offset angle β has a magnitude that divides into 360° an integer number N times. Most preferably, the number of beams is an integer multiple of the number N. Also preferably the rotational offset angle β increments in the same rotational direction as measured from the first beam 8a to the adjacent second beam 8b, from the second beam 8b to the adjacent third beam 8c, and so on from each beam to its next adjacent beam progressing from the first beam (e.g., first beam 8a) to a last beam (e.g., eighth beam 8h). For example, the flexible coupling 108 has eight radially offset beams 8 having a single rotational offset angle β of 45°, which is 360° divided by the integer number N=8. For example, the preferred design rules would also be satisfied if there were two times eight beams 8 (16 beams) having a rotational offset angle β of 45°, which is 360° divided by eight, resulting in a flexible coupling that has twice the flexible length of the flexible coupling 108.

A variety of flexible couplings can be constructed according to the present invention. FIGS. 11 through 18 (FIGS. 11–18) illustrate designs having from two beams 8 to nine beams 8. The designs in FIGS. 11–18 are only examples, since any number of beams 8 is possible. Each of the FIGS. 11–18 shows an end view of a coupling wherein the underlying beams 8 are shown with dashed lines indicating that the beams 8 are hidden under an end hub 2 having a shaft hole 4. FIG. 11 shows a coupling 102 having two beams 8a, 8b that are uniformly rotationally offset by a rotational offset angle β of magnitude 180° (360° divided by 2). FIG. 12 shows a coupling 103 having three beams 8a, 8b, 8c that are uniformly rotationally offset by a rotational offset angle β of magnitude 120° (360° divided by 3). FIG. 13 shows a coupling 104 having four beams 8a, 8b, 8c, 8d that are uniformly rotationally offset by a rotational offset angle β of magnitude 90° (360° divided by 4). FIG. 14 shows a coupling 105 having five beams 8a, 8b, 8c, 8d, 8e that are uniformly rotationally offset by a rotational offset angle β of magnitude 72° (360° divided by 5). FIG. 15 shows a coupling 106 having six beams 8a, 8b, 8c, 8d, 8e, 8f that are uniformly rotationally offset by a rotational offset angle β of magnitude 60° (360° divided by 6). FIG. 16 shows a coupling 107 having seven beams 8a, 8b, 8c, 8d, 8e, 8f, 8g that are uniformly rotationally offset by a rotational offset angle β of magnitude 51.4° (360° divided by 7). FIG. 17 shows a coupling 108 (equivalent to the coupling 108 shown in FIGS. 1 and 2) having eight beams 8a, 8b, 8c, 8d, 8e, 8f, 8g, 8h that are uniformly rotationally offset by a rotational offset angle β of magnitude 45° (360° divided by 8). FIG. 18 shows a coupling 109 having nine beams 8a, 8b, 8c, 8d, 8e, 8f, 8g, 8h, 8i that are uniformly rotationally offset by a rotational offset angle β of magnitude 40° (360° divided by 9).

Increasing the number of beams 8 produces increasingly flexible couplings. A smaller rotational offset angle β between adjacent beams 8 results in a smoother transition for the torsional loading of adjacent beams. For example, the coupling 109 having nine beams 8 with a 40° rotational offset angle β, is much more longitudinally flexible than the coupling 102 having only two beams 8 with a 180° rotational offset angle β.

It is within the scope of the present invention to have different cross-sectional profiles for the slots 10, 11. For illustrative simplicity, the views of FIGS. 1 through 18 and 21 and 21A show squared-off profiles for the slots 10, 11. For example, the cross-sectional view of FIG. 20 shows a portion of the coupling 108 with a squared-off profile. The deep slots 10 (e.g., 10b,10c) each have straight (non-sloping) sides 120, and the paired shallow slots 11 (e.g., 11b, 11c) each have straight (non-sloping) sides 121. The beams 8 (e.g., 8b, 8c) each have a beam length L1 (nominal beam length L1) measured longitudinally between adjacent disks 6 (e.g., disk 6a to disk 6b, or disk 6b to disk 6c); and the beam length L1 is constant for the entire beam 8 (e.g., 8b, 8c). The beams 8 (e.g., 8b, 8c) each have a beam thickness T1 measured between bottoms of paired slots 10/11 (e.g., bottom of shallow slot 11b to bottom of deep slot 10b, or bottom of deep slot 10c to bottom of shallow slot 11c); and the beam thickness T1 is constant for the entire beam 8 (e.g., 8b, 8c). Measured at an outer periphery of the coupling 108, the deep slots 10 (e.g., 10b, 10c) each have a length L4 that is constant for the entire deep slot 10, and therefore equals the beam length L1. Also measured at an outer periphery of the coupling 108, the shallow slots 11 (e.g., 11b, 11c) each have a length L2 that is constant for the entire shallow slot 11, and therefore equals the beam length L1 and thus the deep slot length L4. Finally, measured at the axis of revolution AR, the disks 6 (e.g., disk 6b) each have a length L3 (nominal disk length L3) that is constant for the entire disk 6.

The disk length L3, beam length L1 (equaling slot lengths L2, L4), slot depths D1, D2, and beam thickness T1 can be adjusted to match physical characteristics (e.g., bending stress limit) of the material used for the body 14 with physical demands (e.g., shaft misalignment angle) of an application for the coupling 108. Preferably the coupling 108 has a disk length L3 that is equal to the beam length L1 (and slot lengths L2, L4), and that is also equal to the beam thickness T1.

A preferred cross-sectional profile for slots 410, 411 (compare slots 10, 11) is illustrated in FIGS. 19 and 19A which show cross-sectional views of portions of a preferred sloped-slot design for a flexible coupling 108' (compare 108). The deep slots 410 (e.g., 410b, 410c) each have sides 420 that slope with a slot slope angle φ (opening outward as measured from a slot centerline CL2 to the deep slot side 420), preferably from 0° to 5°, and most preferably from 0° to 2°. Likewise, the paired shallow slots 411 (e.g., 411b, 411c) each have sides 421 that slope with a slot slope angle φ (opening outward as measured from the slot centerline CL2 to the shallow slot side 421), preferably from 0° to 5°, and most preferably from 0° to 2°. Also preferably, the slot slope angle φ has the same magnitude for the deep slots 410 and for the shallow slots 411.

In its simplest form, parallel-sided slots 410/411 open outward with the planes of a plurality of slot slope angles φ all being oriented normal to the entire beam 408, i.e., normal to all points of the beam centerline CL1 (see both FIGS. 19 and 21). However, it is within the scope of the present invention to have fan-sloped slots 410/411 wherein the slot slope angle φ is oriented in a plurality of planes that fan around like radii from a point at the intersection of the beam centerline CL1 and a diameter DMx that is normal to the beam centerline CL1.

An optional, but preferred profile for the sloped slots 410/411 includes slot bottoms 430/431 that are rounded with a radius of curvature RC1.

The beams 408 (e.g., 408b, 408c) each have a beam length L1 between adjacent disks 406 (e.g., disk 406a to disk 406b, or disk 406b to disk 406c) that is measured longitudinally through a beam centerline CL1. The beams 408 (e.g., 408b, 408c) each have a beam thickness T1 measured along the slot centerline CL2 between bottoms (optionally rounded bottoms 430/431) of paired slots 410/411 (e.g., bottom of shallow slot 411b to bottom of deep slot 410b, or bottom of deep slot 410c to bottom of shallow slot 411c). If the bottoms of the slots 410/411 are flat, then the beam thickness T1 is constant for the entire beam 408; but if the rounded bottoms 430/431 are used, then the beam thickness T1 varies along the length L1 of the beam 408 (e.g., 408b, 408c), and has a minimum beam thickness T1 at the slot centerline CL2. If parallel-sided slots 410/411 are used, then the beam length L1 is constant for the entire beam 408; but if fan-sloped slots 410/411 are used, then the beam length L1 varies along the entire beam 408, having a minimum beam length L1 at the point at the intersection of the beam centerline CL1 and the diameter DMx.

Measured at an outer periphery of the coupling 108', the deep slots 410 (e.g., 410b, 410c) each have a length L4, and a depth D2 measured along the diameter DMx that is normal to the beam centerline CL1. If parallel-sided slots 410/411 are used (see FIG. 20), then the deep slot length L4 is constant around the periphery of the deep slots 410; but if fan-sloped slots 410/411 are used (see FIGS. 19 and 19A), then the deep slot length L4 varies around the periphery of the deep slots 410.

Also measured at an outer periphery of the coupling 108', the shallow slots 411 (e.g., 411b, 411c) each have a length L2, and a depth D1 measured along the diameter DMx that is normal to the beam centerline CL1. If parallel-sided slots 410/411 are used, then the shallow slot length L2 is constant around the periphery of the shallow slots 411; but if fan-sloped slots 410/411 are used, then the shallow slot length L2 varies around the periphery of the shallow slots 411. As a result of the slot slope angle φ being preferably equal for the deep slots 410 and for the shallow slots 411, it can be seen that a slot length measured at a shallow slot depth D1 in the deep slot 410 will have the same magnitude as the shallow slot length L2, therefore the length L2 can also be a "nominal slot length L2" that is used to indicate a longitudinal length for all slots 10 and 11, i.e., for both the deep slots 10 and the shallow slots 11, regardless of slot profile.

Finally, measured at the axis of revolution AR, the disks 406 (e.g., disk 406b) each have a nominal disk length L3. As detailed hereinabove, the longitudinal length at any given location on a disk 406 is generally variable and is highly dependent on the magnitude of the slot slope angle φ and on the orientation of the plane of the slot slope angle φ where it passes through the given location.

The nominal disk length L3, beam length L1, slot lengths L2, L4, slot depths D1, D2, beam thickness T1, slot slope angle φ and choice of parallel-sided or fan-sloped slots can be adjusted to match physical characteristics (e.g., bending stress limit) of the material used for the body 414 with physical demands (e.g., shaft misalignment angle) of an application for the coupling 108'.

With reference to FIGS. 22 and 23, the two shafts (not part of the invention, e.g., 901, 903) that are to be flexibly joined by a flexible coupling 208, 308 (compare 108 and 108') are fitted into suitably sized shaft holes 204, 304 (e.g., 204a, 304a, compare 4a, 4b). One shaft hole 204 (e.g., 204a) is coaxially formed in each end 202a, 202b of the coupling 208, the ends 202a, 202b being hubs having means for coaxially connecting each of the ends 202a, 202b to a respective one of the two shafts 901, 903. One shaft hole 304 (e.g., 304a) is coaxially formed in each end 302a, 302b of the coupling 308, the ends 302a, 302b being hubs having means for coaxially connecting each of the ends 302a, 302b to a respective one of the two shafts 901, 903. The suitably sized holes 204, 304 have cross-sectional profiles that fit the dimensions and shape of the cross-sectional profiles of the respective shaft 901, 903. For example, the cross-sectional profiles can be circular (as shown) with diameters that may or may not be the same for the two shafts 901, 903. For example, the cross-sectional profiles can be D-shaped or hexagonal.

FIG. 22 illustrates a first preferred means for coaxially connecting each of the ends 202a, 202b to a respective one of the two shafts 901, 903 using one or more set screws 252 screwed into corresponding threaded set screw holes 250 such that the one or more set screws 252 in an end (e.g., 202a) press into the shaft (e.g., 901) fitted into the respective shaft hole (e.g., 204a).

FIG. 23 illustrates a second preferred means for coaxially connecting each of the ends 302a, 302b to a respective one of the two shafts 901, 903 using clamps 360a, 360b, respectively. The clamps 360a, 360b each comprise a radial clamping slit 356a, 356b that divides a first clamp side 354a, 354b from a second clamp side 358a, 358b. The clamping slit 356a, 356b must not be crossed by a beam in order to assure that at least one of the first and second clamp sides (354a and 358a, or 354b and 358b) is free to move against the other, thereby clamping the shaft 901, 903 in its respective end hub 302a, 302b. The clamping action is accomplished, for example, by a screw 352 in a hole 350 that is threaded only in the first clamp side 354a, 354b.

Any suitable material can be used for the body (e.g., 14) of the flexible couplings (e.g., 108) according to the present invention, but preferably the material is low density (for light weight, low inertia), and resistant to ultraviolet/moisture/oil/fuel/solvent. For example, preferred suitable materials are high performance aluminum alloys or engineered plastics. Use of engineered plastics adds the advantage of being electrically nonconductive.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A flexible coupling for flexibly joining two shafts, the flexible coupling comprising:
   a unitary solid cylindrical body having a first end, a second end, and therebetween having one or more longitudinally spaced circular disks spaced by asymmetric slot pairs;
   a radially offset beam, having a minimum beam thickness (T1) and a longitudinal beam length (L1), formed between a first slot and a second slot of each asymmetric slot pair, such that the radially offset beam is parallel to a diameter of the cylindrical body and is offset from the parallel diameter by a radial beam offset distance (R1);
   each beam being rotationally offset from longitudinally adjacent beams; and
   means at the first end for coaxially connecting the first end to a first one of the two shafts, and means at the second end for coaxially connecting the second end to a second one of the two shafts.

2. The flexible coupling of claim 1, wherein:
   the radial beam offset distance (R1) is approximately equal to the largest of a radius (R2) of a coaxial shaft hole of the means at the first end or at the second end.

3. The flexible coupling of claim 1, wherein:
   a rotational offset angle between longitudinally adjacent beams has the same magnitude for all pairs of longitudinally adjacent beams; and
   the rotational offset angle has a magnitude that divides into 360 degrees an integer number N times.

4. The flexible coupling of claim 3, wherein:
   the quantity of beams is an integer multiple of the number N.

5. The flexible coupling of claim 3, wherein:
   the rotational offset angle increments in the same rotational direction from each beam to each beam's next longitudinally adjacent beam progressing from a first beam at the first end to a last beam at the second end.

6. The flexible coupling of claim 1, wherein:
   all of the disks have a same nominal disk length (L3); and
   all of the first slots and all of the second slots have a same nominal slot length (L2,L4).

7. The flexible coupling of claim 6, wherein:
   the nominal disk length (L3) is equal to the nominal slot length (L2).

8. The flexible coupling of claim 6, wherein:
   the nominal disk length (L3) is equal to a minimum value of the beam length (L1).

9. The flexible coupling of claim 1, wherein:
   the beam length (L1) has a constant value for the entire beam.

10. The flexible coupling of claim 1, wherein:
    each beam has a beam thickness that is uniformly equal to the minimum beam thickness (T1) throughout a longitudinal length between adjacent disks.

11. The flexible coupling of claim 1, wherein:
    each beam has a beam thickness that varies along a longitudinal length between adjacent disks, such that the minimum beam thickness (T1) occurs in the approximate center of the longitudinal length, and the beam thickness increases from the minimum thickness (T1) to a maximum where the beam joins a disk, with the increase being determined by rounded bottoms on the first slot and on the second slot of the asymmetric slot pair that formed the beam.

12. The flexible coupling of claim 1, wherein:
    the means for coaxially connecting each of the first and second ends to one of the two shafts comprises hub means.

13. The flexible coupling of claim 1, wherein:
    the means for coaxially connecting each of the first and second ends to one of the two shafts comprises hub means with a shaft hole with at least one set screw.

14. The flexible coupling of claim 1, wherein:
    the means for coaxially connecting each of the first and second ends to one of the two shafts comprises hub means with a shaft hole and at least one clamp.

15. The flexible coupling of claim 1, wherein:
    the two shafts are rotating members having potentially different axes of rotation.

16. The flexible coupling of claim 1, wherein:
    the two shafts are structural members that require flexible joining.

17. A flexible coupling for flexibly joining two shafts, the flexible coupling comprising:
    a unitary solid cylindrical body having a first end, a second end, and therebetween having one or more longitudinally spaced circular disks spaced by asymmetric slot pairs;
    a radially offset beam, having a minimum beam thickness (T1) and a longitudinal beam length (L1), formed between a first slot and a second slot of each asymmetric slot pair, such that the radially offset beam is parallel to a diameter of the cylindrical body and is offset from the parallel diameter by a radial beam offset distance (R1);
    each beam being rotationally offset from longitudinally adjacent beams; and
    means eat the first end for coaxially connecting the first end to a first one of the two shafts, and means at the second end for coaxially connecting the second end to a second one of the two shafts, and
    wherein the sides of the first slots and the sides of the second slots all have a single valued slot slope angle with respect to the plane of a radial slat centerline, wherein the slot slope angle has a value of up to 5 degrees.

18. The flexible coupling of claim 17, wherein:
the slot slope angle has a value of up to 2 degrees.

19. A method of flexibly joining two shafts with a flexible coupling, comprising the steps of:
  making the flexible coupling out of a unitary solid cylindrical body having a first end and a second end;
  forming a plurality of radially oriented asymmetric slot pairs longitudinally spaced from the first end to the second end;
  forming one or more circular disks longitudinally between asymmetric slot pairs;
  forming a radially offset beam between a first slot and a second slot of each asymmetric slot pair, such that the radially offset beam is parallel to a diameter of the cylindrical body and is offset from the parallel diameter by a radial beam offset distance R1;
  rotationally offsetting each beam from longitudinally adjacent beams; and
  providing means at the first end for coaxially connecting the first end to a first one of the two shafts, and means at the second end for coaxially connecting the second end to a second one of the two shafts.

\* \* \* \* \*